United States Patent [19]

Schacher et al.

[11] 3,712,439
[45] Jan. 23, 1973

[54] ELECTROMAGNETICALLY OPERABLE FRICTION CLUTCH

[75] Inventors: Willi Schacher; Rudolf Schneider, both of 7990 Friedrichshafen, Germany

[73] Assignee: Zahnradfabrik Friedrichshafen Aktiengesellschaft, Friedrichshafen, Germany

[22] Filed: Nov. 13, 1970

[21] Appl. No.: 89,278

[30] Foreign Application Priority Data

Dec. 23, 1969 Germany..................P 19 64 311.9

[52] U.S. Cl..............................192/84 C, 29/418
[51] Int. Cl................................F16d 27/10
[58] Field of Search..................192/84 C; 29/418

[56] References Cited

UNITED STATES PATENTS

| | | | |
|---|---|---|---|
| 2,267,114 | 12/1941 | Lear et al.......................... | 192/84 C X |
| 2,674,359 | 4/1954 | Du Rostu......................... | 192/84 C |
| 3,044,594 | 7/1962 | Bernard............................ | 192/84 C |
| 3,055,475 | 9/1962 | Pitts, Jr............................. | 192/84 C |
| 2,860,403 | 11/1958 | Meyer................................ | 192/84 C X |
| 3,415,347 | 12/1968 | Wrensch........................... | 192/84 C |

*Primary Examiner*—Allen D. Herrmann
*Attorney*—Zalkind, Horne & Shuster

[57] ABSTRACT

A friction clutch is provided with clutch discs each of which is comprised of a plurality of rings of magnetic material magnetically isolated from each other so that flux follows a sinuous path back and forth between the discs via a plurality of pairs of pole faces. Accordingly, a plurality of areas of magnetic attraction between pole faces is afforded to effect strong engagement between discs, both of which are rotary, when a flux is provided by means of a stationary electromagnet. The arrangement minimizes flux leakage and provides for increased ability to transmit torque. The construction is simple and compact, one such disc being manufactured by providing a composite of concentric magnetic and non-magnetic members which after being formed in an integrated assembly can have material removed to effect a plurality of pole faces. The other disc is effected by mounting spaced magnetic rings on a spring member which serves to maintain separation of the discs when the electromagnet is not energized.

6 Claims, 4 Drawing Figures

INVENTORS
Willi Schacher
Rudolf Schneider

ATTORNEY
Zalkind, Horne & Shuster

INVENTORS
Willi Schacher
Rudolf Schneider

ATTORNEY

ELECTROMAGNETICALLY OPERABLE FRICTION CLUTCH

Briefly, the present invention overcomes certain drawbacks of the prior art which uses a plurality of pole surfaces of engageable clutch discs for increasing torque transmittal but such prior art constructions are susceptible to much leakage flux. The present invention seeks to overcome this drawback in a simple construction wherein two friction discs are used, both of which are rotative and axially engageable with each other upon energization of a stationary electromagnet having poles adjacent certain poles of one of the friction discs.

More specifically, in the present construction each clutch friction disc is provided with two pair of flux transmitting areas so that there are effected four polar interfaces on each disc arranged in relationship whereby flux follows a sinuous path between the four polar interfaces. In that manner a stronger attraction between the discs for frictional engagement is effected. The discs are rotary and either disc could be the driving or driven member of the clutch. However, the stationary electromagnet comprising a solenoid within a cup shaped magnet body is disposed at the outer face of one such disc which disc is essentially solid and has no air gaps. This protects the solenoid against any possibility of coming in contact with a moving part since the axial relationship between such solid disc and the solenoid is fixed by keying that disc to the rotary shaft of the clutch and by fastening the solenoid to a housing wall. The solid disc also protects the solenoid from bits or pieces of metal or dust which may accumulate within the clutch.

Minimization of flux leakage is afforded by constructing the other of the clutch discs in the form of two rings of magnetic material spaced by an air gap so that there is no metal bridging the rings except for a disc spring upon which they are assembled and which holds them on the other rotary element of the clutch, e.g., a pulley. However, each such ring is provided with a groove in one face so that the areas separated by the groove constitute pole faces and the point of attachment of the spring is intermediate such faces on the opposite side of each ring. Thus the flux from one face to the other of each ring substantially bypasses the spring instead of flowing directly thereinto.

A detailed description of the invention now follows in conjunction with the appended drawing in which.

Figure 1:
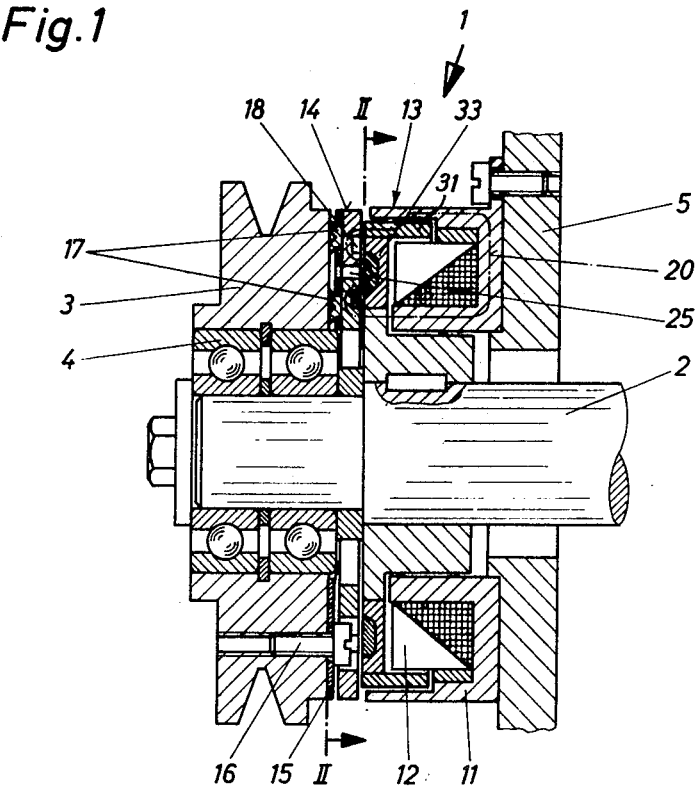
FIG. 1 is a longitudinal cross section of the assembled clutch.

Referring to FIG. 1, the invention comprises an assembly 1 of frictional drive clutch discs 13 and 14 coaxial with a shaft 2 which carries rotatively a pulley 3 on ball bearing means 4 and which shaft passes through a stationary housing 5 fixedly carrying a cup-like circular magnetic body 11 encompassing a solenoid coil 12. A cylindrical ring 31 of magnetic material forms part of disc 13 and has an extended axial length protruding concentrically into the outer collar of body 11 which collar forms a pole face of the electromagnet. Ring 31 extends slightly beyond the outer radial edge of magnet body 11 and is coaxial with a hub member 32 keyed to shaft 2. Hub 32 is of magnetic material and has a radial flange 32' which extends into close proximity to the radial edge of the inner collar of magnetic body 11 which forms another pole face of the electromagnet.

Intermediate magnetic members 31 and 32 is a ring of non-magnetic material 33 and the composite assembly of ring-like members 31, 32 and 33 effects a solid friction disc 13 which shields solenoid 12 and its chamber in the magnet body.

The non-magnetic ring 33 of outer friction of the friction disc 13 holds a ring 31' of magnetic material to form a magnetic flux transmitting region when solenoid 12 is energized. Such energization attracts the disc 14 which serves as an armature and which is axially movable, being carried on pulley 3 via a disc spring 15 as subsequently explained.

Figure 2:
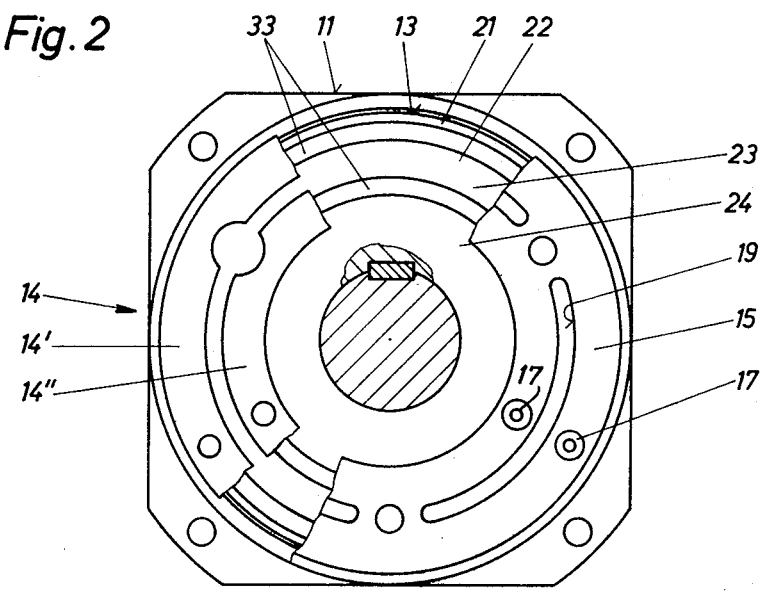
FIG. 2 is a sectional view taken generally on the line II—II of FIG. 1.
Figure 3:
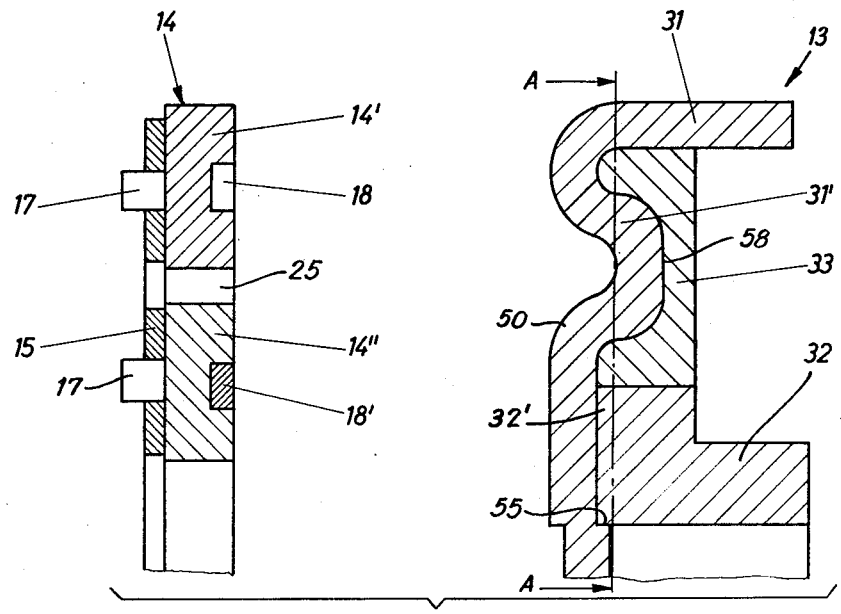
FIG. 3 is a fragmentary exploded view of a step in the manufacture of the clutch discs.
Figure 4:
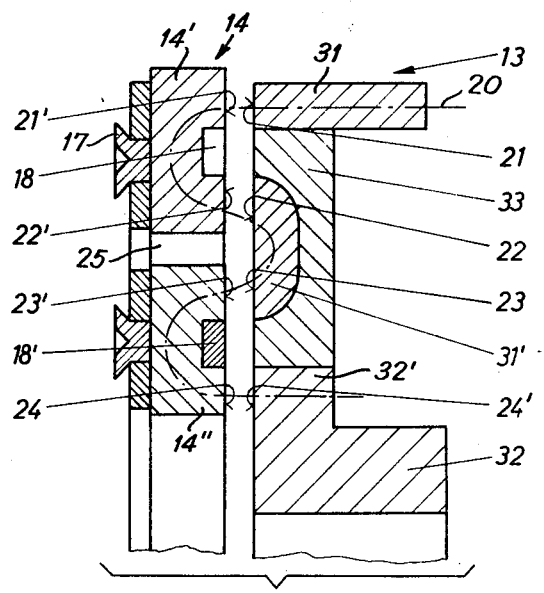
FIG. 4 is a fragmentary exploded view showing the relationship of the polar areas of the clutch discs after manufacture.

The disc 14 is made of a composite of coplanar magnetic rings 14' and 14" separated by an air gap 25 and maintained in assembly by being secured to disc spring 15 by means of rivets 17. As seen in FIGS. 2–4, rivets 17 can be attached at selected points around the backs of rings 14' and 14" to protrude through apertures in spring 15 and then be deformed so as to hold the respective rings on the spring with the air gap 25 concentrically therebetween. The protruding heads of the rivets are given a predetermined axial length so as to pre-stress spring 15 and to act as limit stops for retroactive movement of the armature disc 14 by engaging the inner face of pulley 3, FIG. 1. Spring 15 is provided with slots 19 as seen in FIG. 2 in order to be dished conveniently for flexibility so as to resiliently hold the disc 14 in a normal gapped position with respect to the disc 13, but permitting axial movement of the armature disc 14 to close the gap upon energization of the solenoid for frictional drive engagement with disc 13.

Any suitable means for securing spring 15 to pulley 3 may be provided such as screws 16 each held in a threaded bore in the pulley as seen in FIG. 1.

The magnetic ring 14' is provided with a continuous groove 18 while the ring 14" is likewise grooved. The grooves may be filled with a non-magnetic material exemplified at 18'.

The construction thus described can utilize either the shaft 2 or the pulley 3 as the driving or driven member, i.e., rotary input or output member.

The arrangement of the magnetic rings 14', 14" and 31' provides for a reentrant, sinuous or tortuous flux path via a plurality of poles. Thus, as seen in FIGS. 1 and 4, the flux path 20 passes through the outer collar of magnet body 11, through the pole face 21 to pole face 21', out of pole face 22' to pole face 22, out of pole face 23 to pole face 23', out of pole face 24 to pole face 24', and return through flange 32' and the inner magnet body collar.

The discs are thus provided with four pole faces whereby flux is constrained to follow a tortuous plurality of paths and is confined with minimum leakage to the several magnetic members, affording a plurality of areas of magnetic attraction due to the plurality of poles.

Referring to FIG. 3, it will be noted that the clutch disc 14 is assembled to the disc spring 15 by means of rivets 17 attached to rings 14' and 14''. Thereafter, as shown in FIG. 4, the outer ends of the rivets are deformed in the usual manner so that the rings are securely fastened to the spring. The distance from the outer ends of the rivets to the spring is predetermined so that the disc 14 is in a normally gapped position with respect to the disc 13 when the solenoid of the electromagnet is deenergized. Thus, as noted in FIG. 1, the rivets 17 abut the interface of pulley 3 to effect the non-engaging position of the clutch, and to pre-stress spring 15.

Again, referring to FIG. 3, it will be noted that the hub 32 has a convoluted plate 50 therearound and is of magnetic material, e.g., stamped sheet metal. A non-magnetic material, e.g., brazing material 33 to form the intermediate ring 31' may be poured in melted condition or melted in situ in the convoluted region of plate 50 after hub 32 and the plate are centered with respect to each other by means of assembly on the shoulder 55 of the plate. The non-magnetic material may be a bronze ring or chopped bronze wire about 0.8–1 mm. thick put in the convoluted region and melted by heating of hub 32 and plate 50. Thus, a convex portion 58 of the convoluted area protrudes into a temporary vessel formed by cylindrical flange 31 and hub 32 which with flange 32' effects an inner magnetic ring, while flange 31 forms the outer magnetic ring of disc 13.

Thereafter the frictional face of clutch disc 13 is effected by merely grinding off the surplus of material of plate 50, hub 32' and the protrusions of non-magnetic ring 33 to effect the planar face A—A. This leaves a smooth face wherein a magnetic isolated portion in the form of intermediate ring 31' remains. The grinding off process leaves a thin coating of the non-magnetic material which may be suitably selected so as to be protective to the face of the clutch disc as well as improving the frictional gripping characteristics. The three rings are secured to each other by adherence to the non-magnetic material.

The non-magnetic insert ring can also be effected by heating the assembly of plate 50 and hub 32 so that a suitable substance having plasticity at the heat temperature can be forced against the convoluted area and when solidified the shrinkage effect will bind the parts. Removal of the excess materials is then effected.

By the same token, non-magnetic inserts such as 18', of bronze, may be used to fill the grooves 14' and 14'', or other material selected, so that smoothing the frictional face of that disc as by grinding will likewise provide a protective thin coating which will also enhance the friction gripping effect.

Thus as described above, the clutch discs are provided with planar faces for smooth gripping characteristics wherein each disc has two pairs of poles for transmittal of the flux, all as hereinabove described.

We claim:

1. An electromagnetic clutch comprising an electromagnet having pole faces and means fixedly supporting said electromagnet; a first friction disc adjacent the pole faces of said electromagnet and having a plurality of spaced magnetic rings magnetically isolated from each other; a second friction disc coaxial with said first disc and comprising a plurality of magnetic rings magnetically isolated from each other and disposed to effect a flux path with the rings of said first disc whereby flux effected upon energization of said electromagnet follows reentrant paths comprised of pairs of pole faces on each said disc; said discs being relatively movable axially to engage each other to transmit torque upon said energization of said electromagnet; and means for rotatively mounting said friction discs to transmit torque from a driving to a driven member; said clutch having rotary input and output members; wherein said second disc is comprised of a pair of concentric rings of magnetic material spaced by an air gap; said rings being secured to a dish spring and said spring being secured to one of said rotary members of said clutch, whereby said second disc flexes said spring to move axially toward said first disc for engagement therewith upon said energization of said electromagnet; each of said rings of said second disc having a groove in the face thereof effecting a pair of pole faces for each ring whereby four coplanar pole faces for said second disc are achieved.

2. An electromagnetic clutch as set forth in claim 1 the groove in the innermost of said rings being filled with a non-magnetic material.

3. An electromagnetic clutch as set forth in claim 1, including rivets secured to said rings and passing through said spring and being deformed to secure said rings to said spring; said rivets extending outwardly of said spring to a predetermined distance; said one rotary member of said clutch comprising a radial flange coaxial with said second disc and said second disc being drawn against said flange by said spring to a limiting position effected by the extending portions of said rivets engaging said flange.

4. An electromagnetic clutch comprising an electromagnet having pole faces and means fixedly supporting said electromagnet; a first friction disc adjacent the pole faces of said electromagnet and having a plurality of spaced magnetic rings magnetically isolated from each other; a second friction disc coaxial with said first disc and comprising a plurality of magnetic rings magnetically isolated from each other and disposed to effect a flux path with the rings of said first disc whereby flux effected upon energization of said electromagnet follows reentrant paths comprised of pairs of pole faces on each said disc; said discs being relatively movable axially to engage each other to transmit torque upon said energization of said electromagnet; and means for rotatively mounting said friction discs to transmit torque from a driving to a driven member; including a dish spring and rivets secured to said rings of said second disc and passing through said spring and being deformed to secure said rings to said spring to maintain said rings spaced by an air gap; said rivets extending outwardly of said spring to a predetermined distance; said clutch comprising a radial flange coaxial with said second disc and said second disc being drawn against said flange by said spring to a limiting position effected by the extending portions of said rivets engaging said flange; said clutch including said driving and driven members, and one of said members comprising said flange; whereby said second disc flexes said spring to move axially toward said first disc for engagement therewith upon said energization of said electromagnet.

5. An electromagnetic clutch comprising an electromagnet having pole faces and means fixedly supporting said electromagnet; a first friction disc adjacent the pole faces of said electromagnet and having a plurality of spaced magnetic rings magnetically isolated from each other; a second friction disc coaxial with said first disc and comprising a plurality of magnetic rings magnetically isolated from each other and disposed to effect a flux path with the rings of said first disc whereby flux effected upon energization of said electromagnet follows reentrant paths comprised of pairs of pole faces on each said disc; said discs being relatively movable axially to engage each other to transmit torque upon said energization of said electromagnet; and means for rotatively mounting said friction discs to transmit torque from a driving to a driven member; said clutch having rotary input and output members; wherein said second disc is comprised of a pair of concentric rings of magnetic material spaced by an air gap; said rings being secured to a dish spring and said spring being secured to one of said rotary members of said clutch, whereby said second disc flexes said spring to move axially toward said first disc for engagement therewith upon said energization of said electromagnet; each of said rings of said second disc having a groove in the face thereof effecting a pair of pole faces for each ring whereby four coplanar pole faces for said second disc are achieved; including rivets secured to said rings and passing through said spring and being deformed to secure said rings to said spring; said rivets extending outwardly of said spring to a predetermined distance; said one rotary member of said clutch comprising a pulley having a radial flange coaxial with said second disc and said second disc being drawn against said flange by said spring to a limiting position effected by the extending portions of said rivets engaging said flange whereby said spring is pre-stressed.

6. An electromagnetic clutch comprising an electromagnet having pole faces and means fixedly supporting said electromagnet; a first friction disc adjacent the pole faces of said electromagnet and having a plurality of spaced magnetic rings magnetically isolated from each other; a second friction disc coaxial with said first disc and comprising a plurality of magnetic rings magnetically isolated from each other and disposed to effect a flux path with the rings of said first disc whereby flux effected upon energization of said electromagnet follows reentrant paths comprised of pairs of pole faces on each said disc; said discs being relatively movable axially to engage each other to transmit torque upon said energization of said electromagnet; and means for rotatively mounting said friction discs to transmit torque from a driving to a driven member; said clutch having rotary input and output members; wherein said second disc is comprised of a pair of concentric rings of magnetic material spaced by an air gap; a dish spring; said rings being secured to said dish spring and said spring being secured to one of said rotary members of said clutch, whereby said second disc flexes said spring to move axially toward said first disc for engagement therewith upon said energization of said electromagnet; each of said rings of said second disc having a groove in the face thereof effecting a pair of pole faces for each ring whereby four coplanar pole faces for said second disc are achieved; another of said rotary members being a shaft; said electromagnetic comprising a magnet body having portions effecting the pole faces of said electromagnet and encompassing said shaft; said first disc being keyed to said shaft and carried thereon adjacent said magnet body pole faces; said one of said rotary members being a pulley and having a side flange to which said dish spring is secured; said pulley being rotatively supported on said shaft.

* * * * *